United States Patent [19]

Voisin

[11] Patent Number: 5,194,983
[45] Date of Patent: Mar. 16, 1993

[54] SUPERLATTICE OPTICAL MONITOR

[75] Inventor: Paul Voisin, Paris, France

[73] Assignee: Centre National de la Recherche Scientifique (C.N.R.S.), Paris, France

[21] Appl. No.: 789,407

[22] Filed: Nov. 1, 1991

Related U.S. Application Data

[60] Continuation of Ser. No. 427,330, Oct. 25, 1989, abandoned, which is a division of Ser. No. 128,456, Nov. 24, 1987, abandoned.

[30] Foreign Application Priority Data

Nov. 27, 1986 [FR] France ................. 86 16576

[51] Int. Cl.$^5$ .................. G02F 1/03; H01L 29/161; H01L 27/14
[52] U.S. Cl. .................... 359/245; 359/248; 257/12; 257/431
[58] Field of Search ............ 350/353, 354, 355, 356; 357/4, 30 E, 16; 359/245, 248, 262, 315

[56] References Cited

U.S. PATENT DOCUMENTS

| | | | |
|---|---|---|---|
| 3,501,638 | 10/1967 | Compton et al. | 357/30 E |
| 3,626,257 | 12/1971 | Esaki | 357/58 |
| 4,208,667 | 6/1980 | Chang et al. | 350/354 |
| 4,575,462 | 3/1986 | Dobson et al. | 427/9 |
| 4,665,412 | 5/1987 | Ohkawa et al. | 357/4 |
| 4,745,452 | 5/1988 | Sollner | 357/30 E |
| 4,920,068 | 4/1990 | Valentine, Jr. et al. | 437/81 |

FOREIGN PATENT DOCUMENTS 0143000  5/1985  United Kingdom .

OTHER PUBLICATIONS

R. Orbach; "Dynamics of Fractal Networks", Science, vol. 231 (Feb. 21, 1986) p. 814.
"Semiconductor Quantum-Well Heterostructures" by L. L. Chang Layered Structures and Epitaxy-Materials Research Society Symposia Proceedings vol. 56 (1986) pp. 267–278.

Primary Examiner—Bruce Y. Arnold
Assistant Examiner—Evelyn A. Lester
Attorney, Agent, or Firm—Anderson Kill Olick & Oshinsky

[57] ABSTRACT

An electro-optical component defined by a substrate which is coated in the growth axis direction with a periodic stack of semiconductor layers suitable for defining a superlattice whose quantum wells are fairly strongly coupled together. By applying a control electric field to the superlattice parallel to its growth axis, the optical absorption threshold is varied, and the direction of variation is towards higher energies.

23 Claims, 8 Drawing Sheets

SUPERLATTICE OPTICAL MONITOR

This is a continuation application of Ser. No. 07/427,330, filed Oct. 25, 1989 now abandoned; which is a divisional application of Ser. No. 07/128,456, filed Nov. 24, 1987 now abandoned.

The invention relates to semiconductor superlattices, and proposes an application thereof as electro-optical modulators.

BACKGROUND OF THE INVENTION

A superlattice is a semiconductor structure in which periodic variations in the bottom limit of the conduction band and in the top limit of the valence band appear along one of the axes of the semiconductor (its growth axis).

In practice, a superlattice is defined by a periodic stack of two different kinds of layer on a substrate, the different kinds of layer being constituted by two different compounds or else being doped in different manners.

As a result potential wells appear both in the conduction band (in "dents" for electrons) and in the valence band (in "bumps" for holes).

As a monocrystal, a superlattice is thus a material which is substantially isotropic in the two dimensions of each of its layers. However, it is strongly anisotropic in the third dimension running parallel to its growth axis.

In this respect, numerous situations may be distinguished, depending on the characteristics of the superlattice, and in particular on the thicknesses and the compositions of the layers, which determine whether the electron (or the hole) wave function confers a significant probability on the electrons (or the holes) of reaching an adjacent quantum (potential) well by means of the tunnel effect:

if the probability is substantially zero, then there is a succession of decoupled quantum wells; it is doubtful whether the term "superlattice" is applicable to such a structure;

if the probability of tunneling is significant, then there is a genuine "superlattice"; and if the probability of tunneling is very high, then the structure tends to have the same behavior along its growth axis as it does along the two directions perpendicular thereto, and again it is doubtful whether the term "superlattice" is applicable to such a structure.

At present, there is intense research activity concerning electro-optical modulators as components for use in optical fiber telecommunications.

Most of the recently published results make use of the quadratic Stark effect presented by the fundamental transition of an exciton (an electron-hole pair) into a GaAs—$Al_xGa_{1-x}As$ quantum well (see the article by D. A. B. Miller, J. S. Weiner, and D. S. Chemla, entitled "Electric Field Dependence of Linear Optical Properties in Quantum Well Structures: Wave Guide Electro Absorption and Sum Rules," in IEEE Journal of Quantum Electronics QE22, September 1986, page 1816; and the article by D. A. B. Miller, entitled "Novel Optical Modulators and Bistable Devices Using the Self-Electro-Optic Effect in Semiconductor Quantum Wells," in Surface Science 174, 221, 1386).

In outline the effect is as follows: when an electric field is applied perpendicularly to the plane of the layers, the optical absorption threshold is shifted towards lower energies by an amount (typically a few millielectron-volts) which is proportional to the square of the applied voltage. It is thus possible to use an electrical voltage to vary the transmission of light having a wavelength close to the absorption threshold.

Using this principle and various non-linear properties, it is possible to design a variety of integrated opto-electronic components for optical fiber telecommunications.

Two technical aspects should be observed:

the use of exciton resonance limits this type of component, in practice, to the 0.8 micron range (applicable to GaAs material), since the exciton effects are much greater in a material having the wide forbidden band, whereas the most advantageous "windows" appear to be at 1.3 microns, 1.5 microns, and 4 microns; and it appears that the sign of the shift (towards low energies or towards the red end of the spectrum) implies that these components are always "normally transparent" which is a drawback from the dissipation point of view.

Although the Stark effect does not, a priori require a superlattice (in the general meaning of a periodic structure), it will be understood that it applies to a superlattice, essentially in the first of the above-mentioned categories, i.e. a succession of non-coupled quantum wells.

The present invention relates to a different way of using a superlattice as an electro-optical modulator.

The main aim of the invention is to provide a structure which does not operate by using exciton resonance, and which is therefore not limited to the range of optical wavelengths situated around 0.8 micrometers.

The invention also seeks to provide a structure in which the absorption threshold is shifted towards high energies (and not towards low energies) in response to the application of a controlling electric field.

SUMMARY OF THE INVENTION

To this end, the invention provides a semiconductor electro-optical component comprising, in combination:

a substrate provided along its growth axis with a stack of semiconductor layers suitable for defining a superlattice having quantum wells which are fairly strongly coupled together; and means suitable for applying a control electric field to said superlattice parallel to its growth axis.

By varying the controlling electric field from zero, the value of the optical absorption threshold of the superlattice is modulated. In addition, the shift takes place towards high energies (towards the blue end of the spectrum) by an amount equal to several millielectron-volts (meV). A first essential advantage stems therefrom: the electro-optical component may be used as a "normally opaque" device, which is made transparent by applying a control voltage thereto, and this is due to the fact that the observed effect shows up as a blue shift.

Another advantage is that the effect may manifest itself in superlattices constructed in all sorts of systems (with the term "systems" being used to designate the natures of the semiconductors constituting the superlattice), and in particular systems having a low energy gap between the top of the valence band and the bottom of the conduction band.

Typically, the layers of a superlattice have thickness of up to 10 nanometers, with the most common values being 4 to 6 nanometers (40 to 60 angstroms) for each layer.

In the so-called III-V system, the stacked layers are made of alloys firstly of aluminum, gallium, and/or indium, and secondly of phosphorus, arsenic, and/or antimony, said alloys being binary or ternary, in particular.

In the so-called II–VI system, the stacked layers are made, for example, of alloys of tellurium with mercury and/or cadmium and/or zinc.

In a particular embodiment of the invention, the superlattice is made of layers of InAs-GaSb.

A component in accordance with the invention may be used as an electro-optical modulator which is normally off in the absence of an applied controlling electric field.

The invention may also be defined in the form of an electro-optical method comprising the following steps:

a superlattice is provided comprising a substrate coated in the growth axis direction with a stack of semiconductor layers suitable for defining a heterostructure in which the quantum wells are fairly strongly coupled together by the "resonant tunnel effect";

applying working light to the superlattice; and subjecting said superlattice to a control electric field extending parallel to its growth axis.

The electric field sets up a potential difference between two successive quantum wells in such a manner that the tunnel effect becomes slightly non-resonant, thereby modifying the band structure of the superlattice. As explained below this modification of the superlattice band structure gives rise to the high energy shift or blue shift of the absorption threshold of any electromagnetic radiation (or "light") applied to the superlattice.

This absorption threshold effect may manifest itself not only along the direction of the growth axis, but also along the other directions of the superlattice.

BRIEF DESCRIPTION OF THE DRAWINGS

Implementations of the invention are described by way of example with reference to the accompanying drawings, in which.

MORE DETAILED DESCRIPTION

Figure 1:
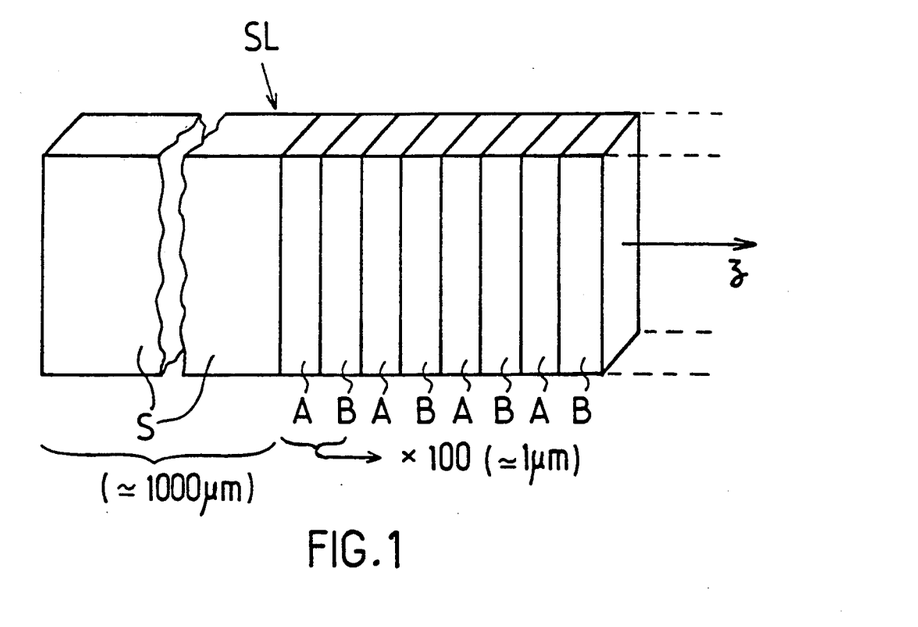
FIG. 1 is a diagrammatic perspective view showing the general structure of a superlattice.

In FIG. 1, the superlattice SL comprises a substrate S which is a fraction of a millimeter thick. Alternating layers of materials A and B are grown on this substrate, for example by molecular jet epitaxy, and these layers are grown in a growth direction marked z. The drawing is not to scale, and it may be assumed that the superlattice comprises about 100 pairs of layers A and B where the total thickness of all the layers is about one micrometer.

Figure 2:
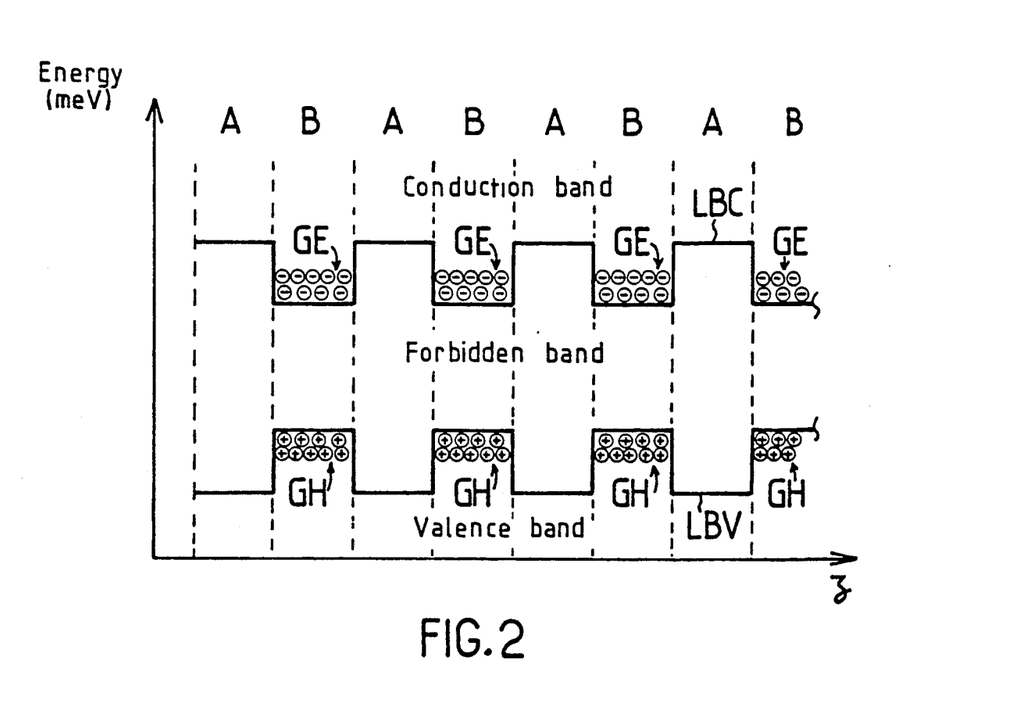
FIG. 2 is a diagram showing how the conduction and valence bands vary along the growth axis of a superlattice.

FIG. 2 is a diagram showing the general appearance of the limits of the conduction band and of the valence band (LBC and LBV respectively) within a superlattice on going from an A layer to a B layer, and so on. The Y axis in FIG. 2 represents energy, which may be expressed in millielectron-volts, for example.

In FIG. 2, which relates to a type I superlattice, potential wells can be seen constituted by dents in the conduction band limit LBC. The corresponding charge carriers, i.e. electrons, will preferably occupy these potential wells. The drawing thus shows a cloud of electrons GE in each of these potential wells. This is a simplification since the energy levels which the electrons can occupy in a superlattice are quantized, in other words it can be said that there are "sub-bands" in the conduction band.

Similarly, there is a cloud of positive charge carriers or "holes" in each of the valence band wells, which show up in the drawing as "bumps" in the valence band. These clouds of holes are referenced GH.

The forbidden band of a superlattice is the gap between the fundamental conduction and valence sub-bands.

The term "superlattice" has two meanings. It may be used to designate a structure such as that shown in FIG. 1 regardless of its intrinsic characteristics.

However, the present trend is to reserve the term for structures of this nature in which the geometrical and material characteristics of the superlattice are such that resonant tunnel effect coupling exists between pairs of consecutive quantum wells.

When there is no such coupling, it would be better to speak of a succession of quantum wells rather than a superlattice. And such a system is two-dimensional since its anisotropy in the z direction is total, whereas it is isotropic in the other two perpendicular directions.

In contrast, when a superlattice has quantum wells which are fairly strongly coupled together by the (resonant) tunnel effect, the dimension of the system lies somewhere between 2 and 3 by virtue of this resonant tunnel effect coupling between the various wells.

Although this consideration only applies later on, it is stated here that if the coupling between two consecutive wells is extremely strong, then the system is invariant with respect to translation in the z direction so long as said translation is equal to an integer number of superlattice periods. Such a system is thus three-dimensional, and the term "superlattice" is again doubtfully applicable.

Figure 3A:
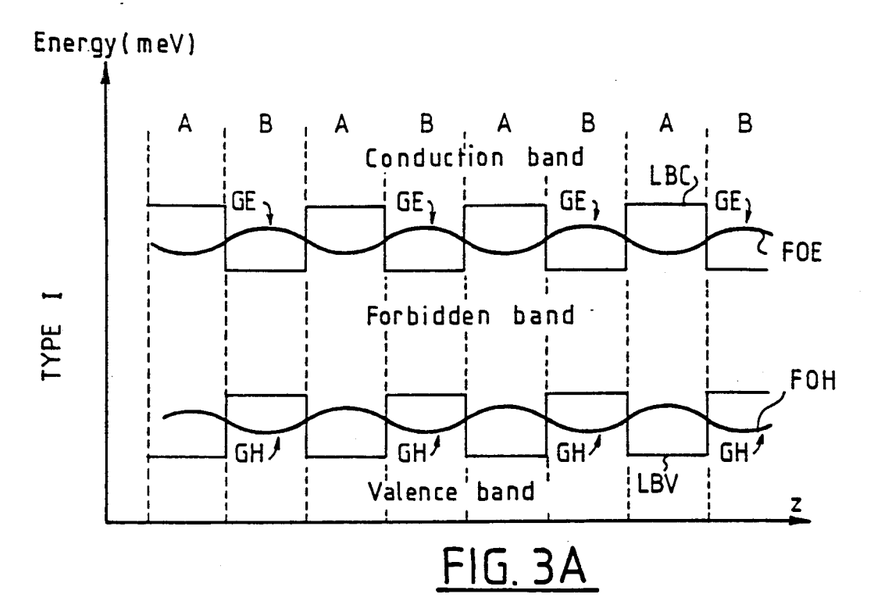
FIG. 3A is similar to FIG. 2, but also shows the wave functions applicable to electrons and to holes, in the special case of a type I superlattice.
Figure 3B:
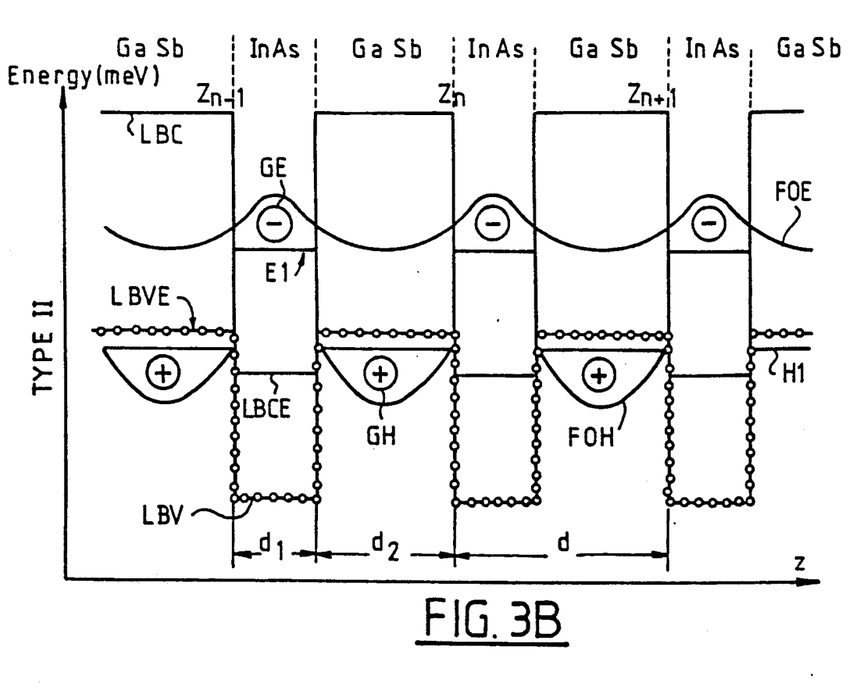
FIG. 3B is a diagram comparable to FIG. 3A, but applicable to a type II superlattice.

The distinction between type I and type II superlattices appears from FIGS. 3A and 3B.

In a type I superlattice (FIG. 3A), the quantum wells at the conduction band limit LBC are at substantially the same levels in the growth axis direction z as are the quantum wells (bumps) of the valence band limit LBV.

For a type II superlattice (FIG. 3B) the exact opposite is true, in other words the quantum wells in the conduction band limit LBC (which in this case are in InAs material) are in phase opposition relative to the quantum wells for the holes (which is this case are in layers of GaSb).

FIGS. 3A and 3B also show the electron wave function FOE and the hole wave function FOH.

These wave functions are representative of the probability of an electron (or a hole) being present along the z axis. These wave functions are shown purely qualitatively. With this in mind, it can be seen that the probability of electrons being present is at a maximum in the conduction band wells. However, the wave function FOE has evanescent skirts on either side of the wells going through the forbidden band before encountering an adjacent conduction band well on one side or the other.

The same applies to the hole wave function FOH, but it should be observed that because of the higher mass of holes, the evanescent skirts of the corresponding wave functions FOH generally fall off more rapidly than they do for electrons.

In FIG. 3A, it is assumed that the two wave functions FOE and FOH have evanescent skirts.

In FIG. 3B, for the reason explained above, it is assumed on the contrary that only the electron wave function FOE has appreciable evanescent skirts, with the hole wave function FOH being limited in practice to the corresponding potential wells.

Figure 4A:
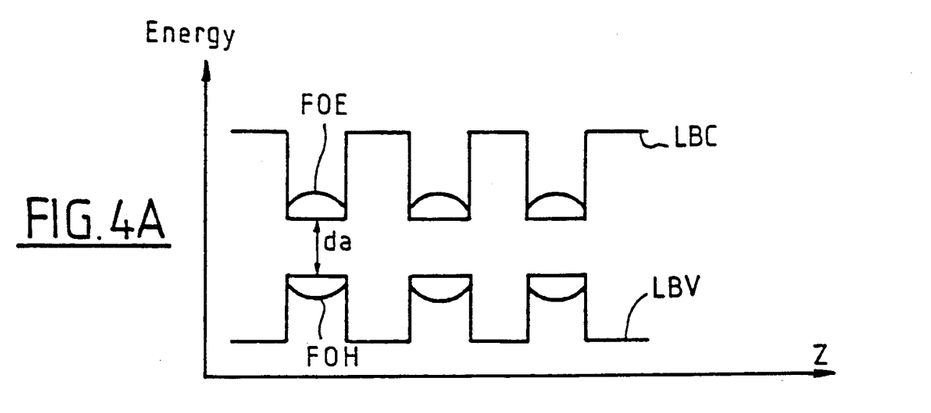
FIGS. 4A and 4B are two simplified diagrams similar to FIGS. 2 and 3, and showing the phenomenon known as the quantum-confined Stark effect.

FIG. 4A relates to a "false superlattice", i.e. a periodic stack of layers whose potential wells are practically completely uncoupled from one another. The wave functions FOE and FOH therefore exist, in substance, solely in the potential wells relating to electrons and to holes, respectively.

The minimum distance between the lines LBC and LBV is referenced $d_a$ and for reasons of simplicity it is assumed, in the present case, to be equal to the forbidden band gap of the heterostructure.

Figure 4B:
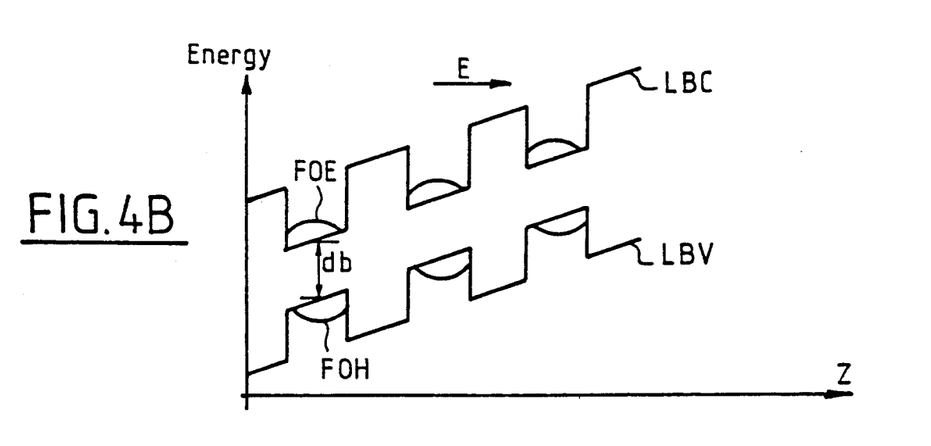

When an electric field is applied to such a structure along the z axis, electrostatic potential energy is added to the crystal field in such a manner that the energy levels are progressively shifted along the z axis. The curves LBC and LBV therefore take up a sloping shape as shown in FIG. 4B. As a result, the electron wave function FOE is slightly offset in the z axis direction compared with the hole wave function FOH. This lies at the back of the above-mentioned Stark effect. It can be seen to be due to asymmetry of the wave functions in each quantum well. The quadratic nature of the Stark effect is due to the fact that it is the displacement of the wave functions, i.e. an induced effect, which in turn induces a variation in the energy levels.

It is also clear on examining FIG. 4B that the minimum distance $d_b$ between the lines LBC and LBV, given the weighting due to the wave functions, is now less than the distance $d_a$ shown in FIG. 4A.

In other words, in the presence of an electric field, the forbidden band gap is reduced compared with the value which it has when there is no electric field.

The above is a highly simplified explanation of the quantum-confined Stark effect on the assumption that the transition is of the band-to-band type, and ignoring the existence of any exciton coupling between an electron and a hole. In practice, this exciton effect makes things rather more complex. However, qualitatively speaking, the above description remains correct.

Figure 4C:
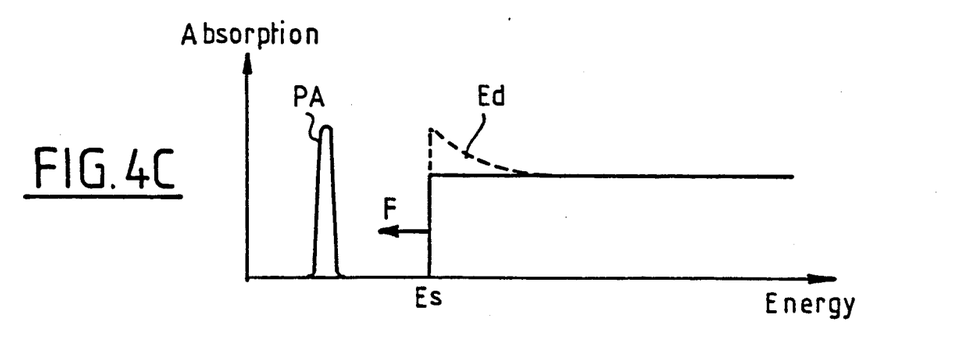
FIG. 4C is a graph showing absorption as a function of energy resulting from this Stark effect.

The final result of this Stark effect is shown in FIG. 4C which is a graph of the absorption coefficient as a function of photon energy and which shows:

Initially an exciton absorption peak PA, followed by an absorption continuum running from an energy threshold $E_s$. The Coulomb interaction has the effect of making this continuum begin with a peak $E_d$ which is shown in dashed lines prior to falling off to a constant value.

In the presence of an electric field, there is a red shift (i.e. towards low energies) of the absorption threshold $E_s$, and of the peak PA as indicated by arrow F in FIG. 4C.

This shift is proportional to the square of the applied electric field (or of the voltage) and it increases with the thickness of the quantum well.

There follows an explanation in greater detail concerning the above observations.

The use of exciton resonance in the quantum-confined Stark effect limits this type of component, in practice, to the 0.8 micrometer range of wavelengths (GaAs material), whereas the windows which appear to be most advantageous for optical transmission lie at 1.3 micrometers, 1.5 micrometers, and 4 micrometers.

It appears that the sign of the shift in the absorption threshold towards low energies or towards the red end of the spectrum implies that such components are always normally "on" (i.e. light-transmitting), which is a drawback from the dissipation point of view since it usually happens that a component is more often in the rest state than in the working state.

In the same highly diagrammatic manner, FIG. 3A shows the characteristics of a superlattice as used in accordance with the invention.

Although it is not strictly limited thereto, the invention is preferably applied to "small gap" materials, i.e. to materials in which the minimum gap between the conduction and valence band limits LBC and LBV is small.

Unlike FIGS. 4A to 4C, it can now be seen that the wave functions FOE and FOH have evanescent skirts. In other words, consecutive quantum wells are now fairly strongly coupled by a tunnel effect known as the resonant tunnel effect.

It has been observed that when an electric field is applied to such a superlattice, the resonance of the tunnel effect tends to be reduced or eliminated, thereby reducing the band width of the superlattice. That is to say the band width of a superlattice results from the resonant tunnel coupling between the various quantum wells.

If this resonance is reduced, then the band width is likewise reduced.

When there is no tunnel effect coupling, the energy levels available to the electrons and to the holes are rendered discrete. Referring, for example, to FIG. 3B, the first available energy level for electrons in the conduction band quantum well is established at E1.

Similarly, the first available energy level for holes in the valence band is established at H1. These energy levels E1 and H1 are identical for all of the quantum wells in the superlattice. That is why the tunnel effect which couples them together is said to be "resonant".

The effect of the resonant tunnel effect is for said energy levels to become permitted state bands. In other words there exists a degree of permitted variation DE1 about E1 and DH1 about H1. These general considerations on superlattices have already been developed in French patent application number 85 12 970 filed Aug.

30, 1985. Where appropriate, the descriptive content of said prior application is incorporated in the present description.

When an electric field is applied to this superlattice (FIG. 5A) the quantum levels establish themselves at different energies in the various wells, and as a result the tunnel effect is no longer resonant. This means that the band widths DE1 and DH1 are reduced whereas, to a first approximation, there have been practically no changes in the energy values E1 and H1 in the quantum wells since these values depend on the electric field only via a quadratic term which is small for narrow wells under consideration here.

A remarkable consequence stems from reducing the energy bands in this way about fixed values: the forbidden band gap increases.

Thus, in accordance with the present invention, a new application is provided for superlattices based on a novel effect, and this makes it possible to provide a much more general and more satisfying application for them, particularly as optical modulators.

Figure 6:
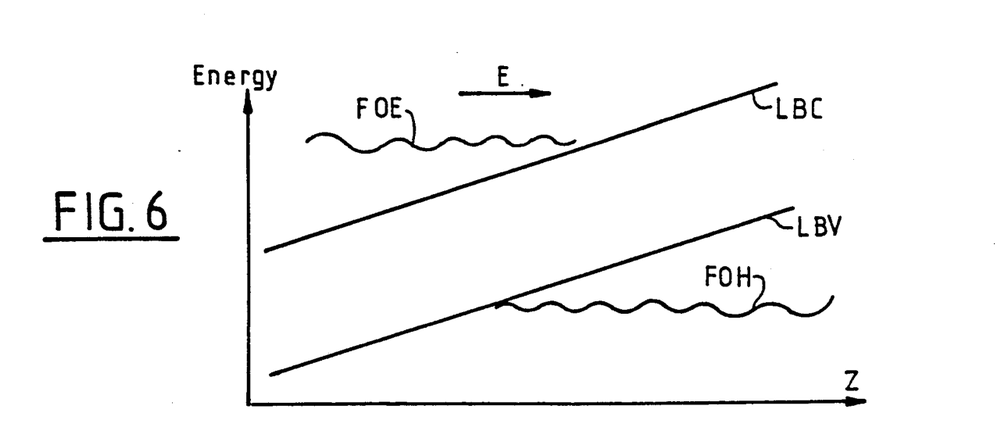
FIG. 6 is a diagram similar to FIGS. 2 and 3 in a different situation where the phenomenon known as the Franz-Keldish effect can be observed.

Reference is now made briefly to FIG. 6 which applies to a structure which is invariant with respect to periodic translation along the z axis.

When the effect of the electric field tends to separate electrons from holes, a phenomenon known under the name of the Franz-Keldish effect is obtained which relies on the displacements in space along the z axis of the probabilities of an electron and of a hole being present (i.e. on the wave functions FOE and FOH). As a result, given the sloping appearance of the conduction band and valence band limits LBC and LBV when an electric field is applied, it will be understood that the width of the forbidden band is reduced by the applied electric fields, and consequently that there is a red shift relating to the average separation between the probabilities that an electron or a hole is present.

It now appears that the novel effect in accordance with the invention manifests itself between two electro-optical effects which are comparable in some respects, but which take place in opposite directions:

for a false superlattice constituted by successive quantum wells which are not coupled together, the quantum confined Stark effect gives rise to the absorption threshold being red shifted; the system is of dimension 2 for the phenomenon under consideration, since it is isotropic in the two dimensions perpendicular to the z axis, and there is no continuity along the z axis;

in the other extreme case where the system is invariant under translation for the phenomenon under consideration, i.e. when the effect of the electric field is simply to separate electrons from holes, which are almost totally free to jump from one quantum well to an adjacent quantum well, then the Franz-Keldish effect is produced which also gives rise to the absorption threshold being red shifted; the system is then of dimension 3 since the phenomenon takes place just as well along the z as along the two directions perpendicular thereto; and in contrast, in the present invention when quantum wells are fairly strongly coupled together but are not fully coupled, a novel effect occurs in accordance with the invention in the form of the absorption threshold being blue shifted (i.e. towards higher energies); and it is observed that the dimensionality of the system lies between 2 and 3.

Figure 7:
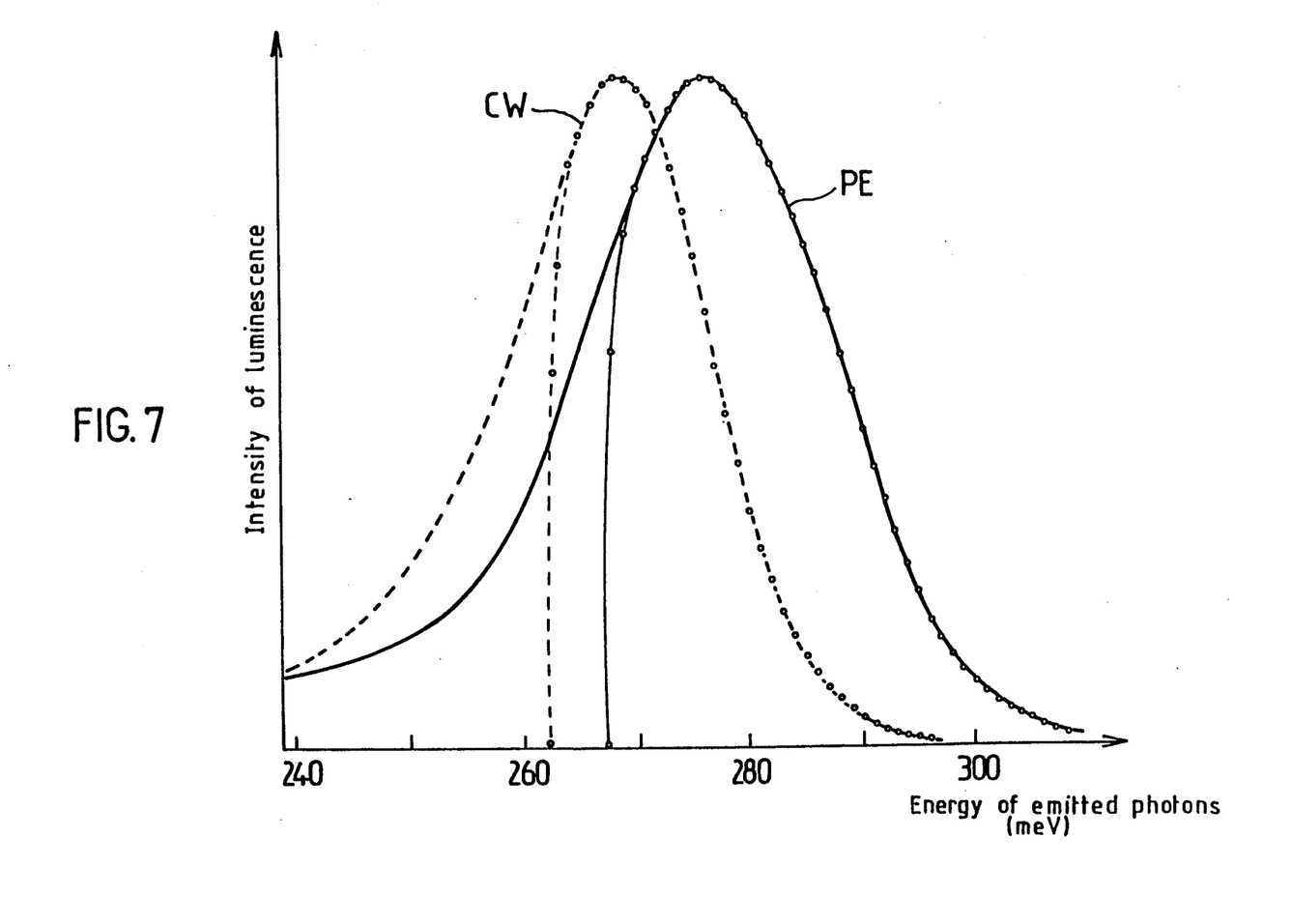
FIG. 7 is a graph showing luminance intensity as a function of the emitted photon energy, and constituting experimental proof of the effect in accordance with the invention.

FIG. 7 gives an indirect experimental manifestation of the effect in accordance with the invention.

In the above-mentioned patent application No. 85 12 970, the same figure appears as FIG. 5.

This figure shows the luminescence spectrum obtained when exciting an InAs/GaSb superlattice (with layer thickness respectively of 3 nanometers and of 5 nanometers) when excited firstly by a continuous wave krypton laser and secondly by an argon laser provided with an acousto-optical modulator and delivering short pulses of about 20 nanoseconds duration at an energy of 150 nanojoules per pulse, whereas the continuous excitation takes place at 80 milliwatts.

FIG. 7 shows that the luminescence curve under continuous wave excitation CW consists in a single spectrum line centered on about 270 meV, and includes a low energy side which tends to saturate when the excitation level is increased.

When the superlattice is excited by short pulses, curve PE is obtained, thereby demonstrating an overall shift to higher energies. The small circles interconnected by lines (a dashed line for curve CW and a continuous line for curve PE) represent theoretically derived points for the luminescence spectrums in terms of intrinsic recombination. The low energy cut-offs of these theoretical curves is due to the forbidden gap of the superlattice and is therefore wider when the superlattice is subjected to pulse excitation.

In the above-mentioned patent application, various effects are suggested for explaining this shift, in particular the known phenomenon of periodic band curvature associated with spatial separation of the carriers.

It has been observed that this effect is insufficient for explaining the amount of variation actually encountered.

The prior patent application deduced that a transient photo-induced effect existed (and indeed that constitutes the subject matter of said prior patent application) in the form of an electrical voltage appearing across the ends of the superlattice.

However it has now been possible to quantify the various effects involved more accurately. It therefore appears that the blue shift reflects a contribution from the novel effect described in accordance with the present invention with the photo-induced electrical voltage modifying the forbidden gap of the superlattice in return, as explained herein.

Figure 8:
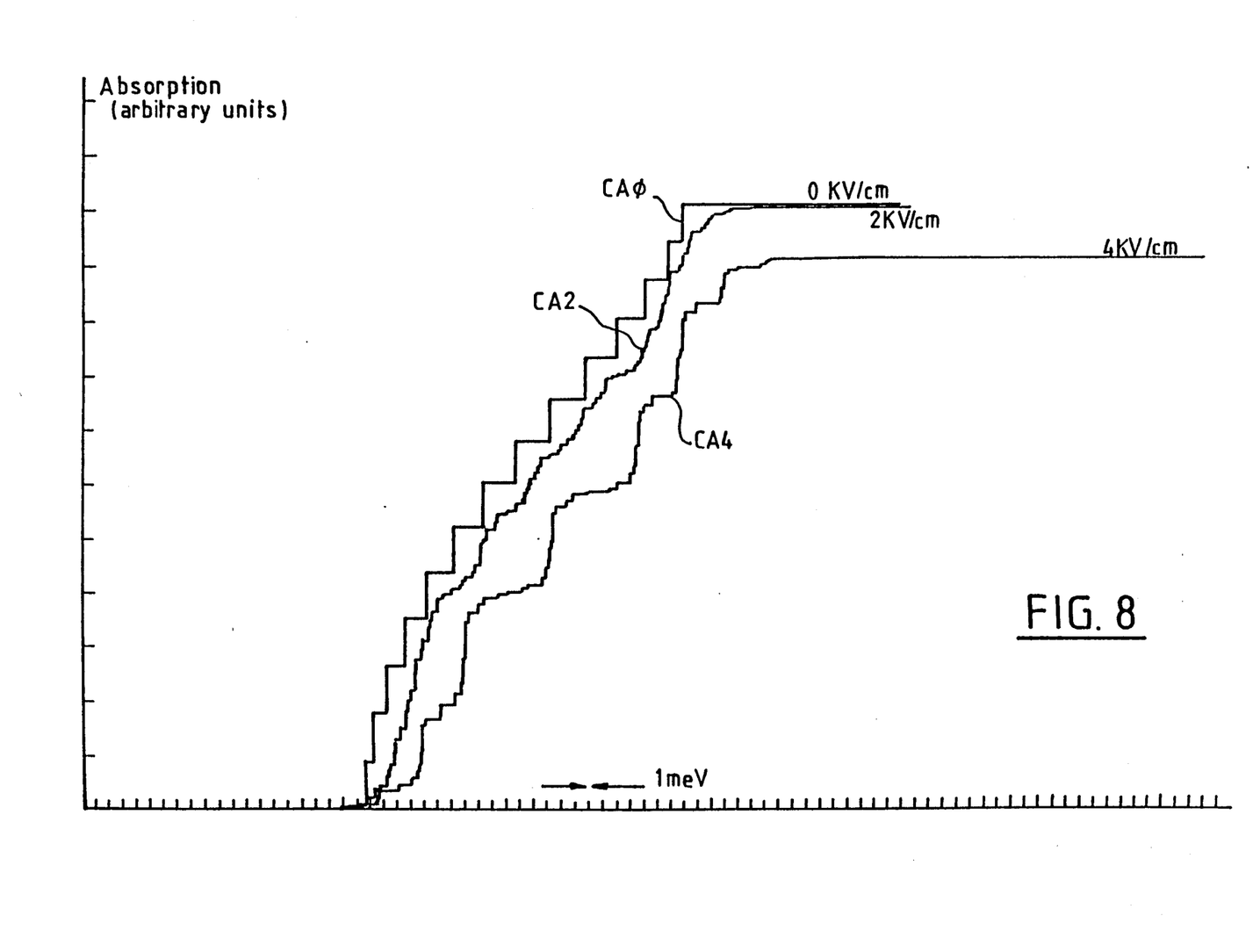
FIGS. 8 and 8A are two graphs showing absorption as a function of energy and constituting further proof of the effect in accordance with the invention.
Figure 8A:
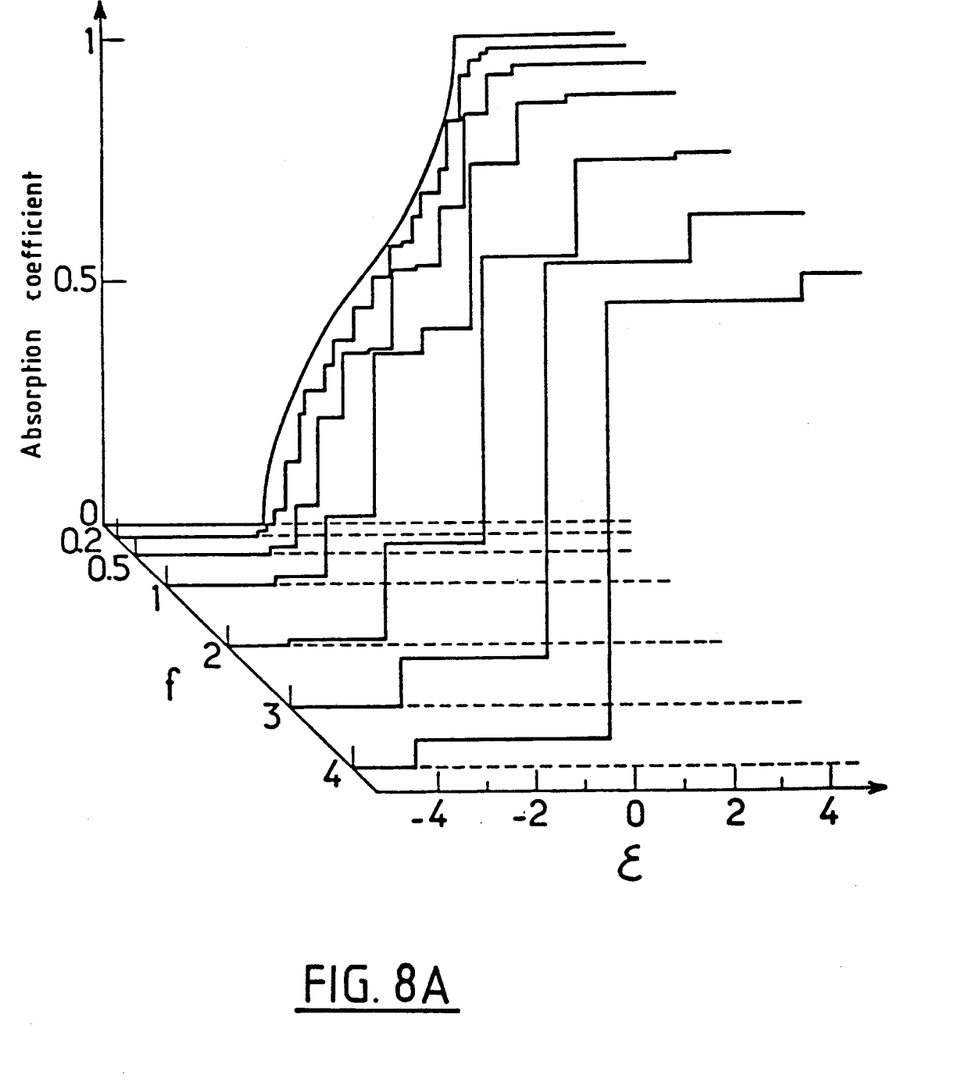

Theoretical and experimental investigations have been performed on the basis of this observation, and the results are shown in FIGS. 8 and 8A.

FIG. 8 relates to 16 quantum wells having a thickness of 4 nanometers and which are separated by barriers that are likewise 4 nanometers thick, with the basic material being GaAs.

Figure 5A:
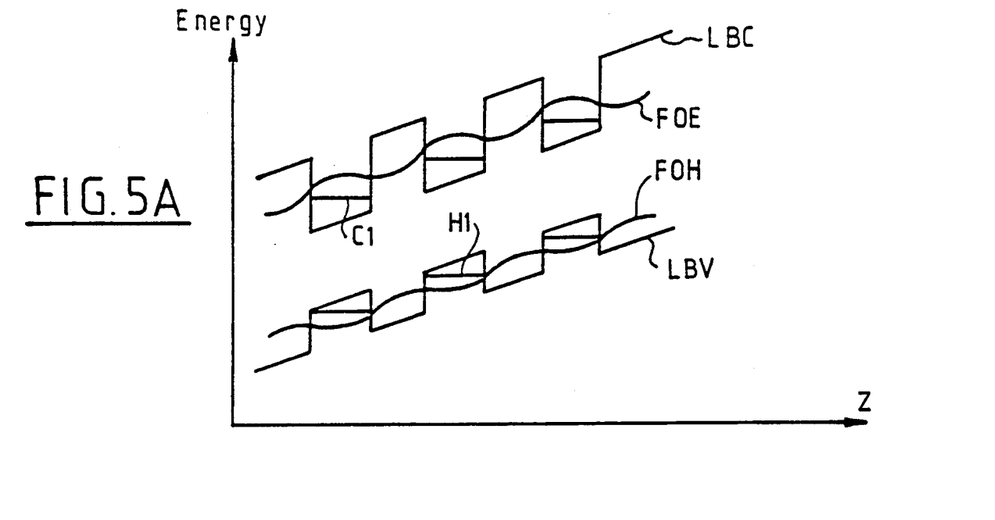
FIGS. 5A and 5B are a diagram similar to FIGS. 2 and 3 and serve to show up the effect in accordance with the invention.
Figure 5B:
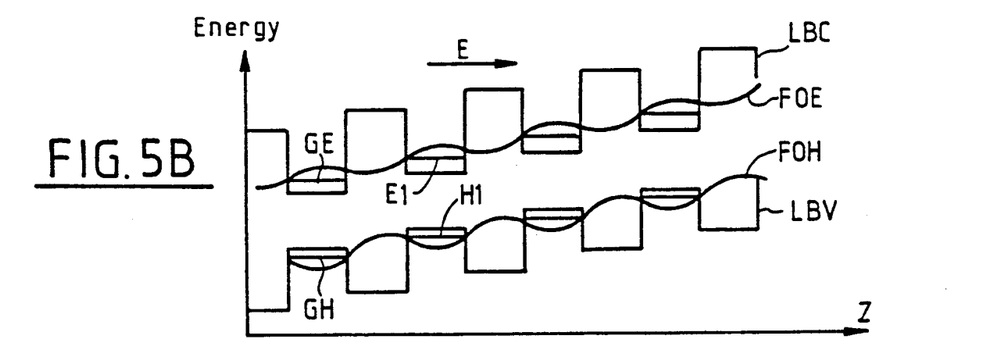

This provides a structure comprising sixteen quantum wells separated by 15 barriers and electric fields of 0, 2, and 4 kilovolts per centimeter were successively thereto, said values being very low since they correspond to a maximum voltage of 72 millivolts across the terminals of the structure. Calculation was performed by using the potential of FIG. 5B as an approximation to the potential of 5A which amounts to ignoring a small term contributing to the quantum confined Stark effect, which is in any case negligible for these thicknesses and these electric field values.

At zero field, curve CA0 has a staircase structure with 15 levels representative of the structure of the superlattice.

This staircase structure shows that of the $n^2$ existing combined states of holes and electrons, only n states contribute to optical absorption, taking account of the various possibilities of installing symmetrical and antisymmetrical functions on the structure.

It should also be observed that it is assumed here that only wave functions relating to electrons and having evanescent skirts are significant, with holes having no skirts given their higher effective mass.

When an electric field is now applied, the discrete appearance (staircase steps) of the curve is considerably attenuated since there are not $n^2$ steps, and this is due to symmetry being broken by the electric field. As a result curve CA2 provides variation which appears to be continuous between absorption zero at low energies and saturated absorption at high energies, which is close to that obtained for zero fields.

When the electric field is further increased, giving 4 kilovolts per centimeter, the resulting curve CA4 which retains a fine discrete structure nevertheless also gives rise to a large scale staircase structure which is representative of the Franz-Keldish effect beginning to appear.

It is thus shown that applying an electric field to a superlattice (limited in this case to 15 barriers) gives rise to a small amount of variation in the absorption threshold (by a few millielectron-volts) and that this variation takes place towards high energies.

The curves in FIG. 8 relate to a GaAs type structure giving rise to a type I superlattice in which there is no space separation of charges.

However, the invention may also occur in a type II superlattice.

The characteristic thicknesses of the materials should be selected so that successive quantum wells are fairly strongly coupled together. The person skilled in the art knows how to evaluate such coupling, for example, as described in:

a) G. Bastard, Phys. Rev. B 24, 5693 (1981) and B 25, 7584 (1982).

b) P. Voisin, G. Bastard, M. Voos, "Optical Selection Rules in Superlattices in the Envelope Function Approximation" Phys. Re. Vol 29, page 935, 1984.

FIG. 8A shows the normalized absorption of a 41 period GaAs/AlGaAs superlattice as a function of a parameter "epsilon" relating to photon energy, for increasing values of an electric field parameter "f".

A blue shift can clearly be seen on increasing the electric field from f=0 to f=4 (see the large step in curve f=4, with the other steps representing only 10% of total absorption in the units used).

Periodic oscillations of the absorption coefficient at fixed photon energy are also observed in the form of an inverse function of the electric field, close to the band edge, e.g. "epsilon"=0.9.

The invention assumes that the thicknesses of the wells and of the barriers are sufficiently small.

However, the thicknesses of the material must not be too small since otherwise the Franz-Keldish effect becomes dominant.

It is estimated that material thicknesses lying in the range 30 angstroms to 50 angstroms are suitable, which corresponds to condition sub-bands which are a few tens of millielectron-volts wide.

Naturally, as mentioned above, the effect of the invention is not limited to the GaAs system. It may occur with numerous other binary or ternary alloys of materials, in particular with III-V semiconductors and more precisely with IIIA-VA semiconductors, or else with II-VI materials, and more particularly IIB-VIA materials or even with IV-IV (IVA-IVA) or else IV-VI (IVA-VIA) materials.

If the wavelength of the optical transmission to be modulated corresponds to 0.8 micrometers, a GaAs/AlGaAs superlattice is appropriate, however other superlattices may also be used, e.g. CdTe/ZnTe.

For wavelengths in the 1.5 micron range and in the 1.3 micron range, the following may be used: GaSb/AlSb, or else InGaAs/InP, or InGaAs/AlInAs.

For modulators in the four micrometer range (fluoride-containing glass fibers), InAs/GaSb superlattices operating as mentioned above are particularly advantageous.

Figure 9:
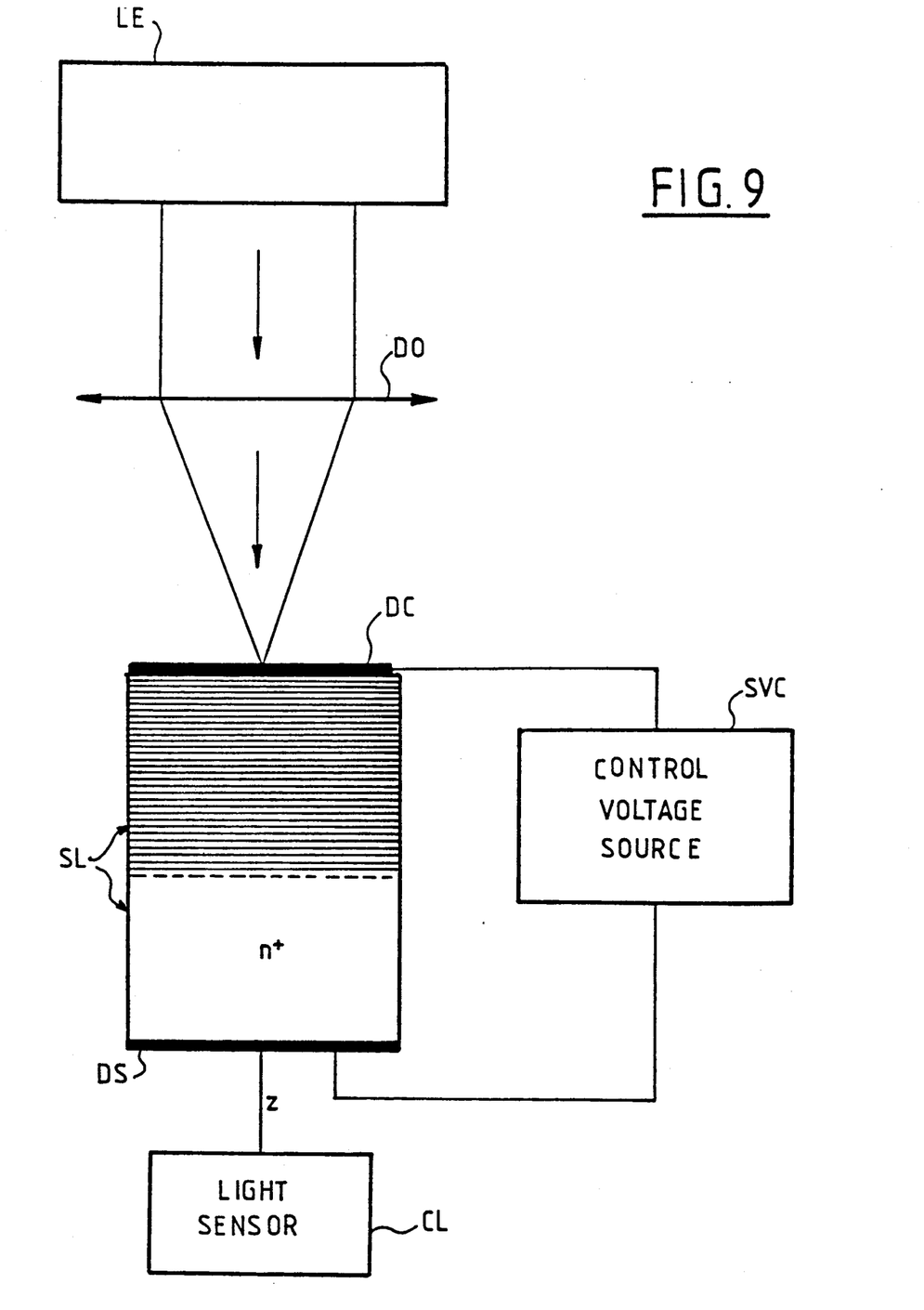
FIG. 9 shows a device for implementing the invention.

FIG. 9 shows a device in accordance with the invention.

Light from a source LE (e.g. a laser followed by an optical fiber) is applied through a coupling lens DO to one end of a superlattice SL.

This end is provided with a transparent contact layer DC, e.g. a semitransparent metal electrode made by UHF evaporation, or else a fine layer of highly doped semiconductor provided during superlattice growth.

At the opposite end, another transparent contact layer DS similar to the preceding contact layer is provided on the substrate.

A source SVC produces an adjustable control voltage which is applied between the layers DC and DS.

The light passing through the superlattice along the z axis is detected by a sensor CL which is optionally associated with a downstream optical fiber.

In a variant, the light passes through the superlattic perpendicularly to its growth axis z. In this case, the contact layers need not be transparent.

It is then possible to couple on a common substrate both a light emitter (optionally including a superlattice) and a modulator in accordance with the invention.

Naturally, the invention is not limited to the embodiments described. It may be applied not only to periodic superlattices as defined above, but also to any type of heterostructure having quantum wells which are strongly coupled by the tunnel effect, or having groups of such quantum wells.

I claim:

1. An electro-optical method, comprising the steps of:
a) providing a superlattice comprising a periodic stack of semi-conductor layers extending along a growth axis thereof, each period of said stack comprising a group of adjacent layers, the layers in each said semi-conductor layer group having materials and thicknesses selected together so that adjacent semi-conductor layer groups are mutually coupled by resonant tunnel effect, with said resonant tunnel effect resulting in said superlattice having progressive optical absorption properties in a given photo energy band having a significant width which is related to the optical transition between authorized valence and conduction sub-bands of energy for electrons;
b) applying a working light to said superlattice, said working light having a wavelength about said given band;
c) applying a control electric field to said superlattice parallel to said growth axis thereof, to alter said resonant coupling for varying the width of said given band of progressive optical absorption properties, without substantially changing the center position thereof, thereby influencing cooperation of said working light with said superlattice.

2. A method according to claim 1, wherein said stack of semi-conductor layers is made of III-V materials.

3. A method according to claim 2, wherein said III-V materials include alloys firstly between aluminum, gallium and indium, and secondly between phosphorus, arsenic and antimony.

4. A method according to claim 1, wherein said superlattice providing step includes providing a superlattice coated with a stack of semi-conductor layers made of InAs-GaSb.

5. A method according to claim 1, wherein said superlattice providing step includes providing a superlattice coated with a stack of semi-conductor layers made of II-VI materials.

6. A method according to claim 5, wherein said II-VI materials include alloys of tellurium with mercury.

7. A method according to claim 5, wherein said II-VI materials include alloys of tellurium with cadmium.

8. A method according to claim 5, wherein said II-VI materials include alloys of tellurium with zinc.

9. A method according to claim 5, wherein said II-VI materials include alloys of tellurium with mercury and alloys of tellurium with cadmium.

10. A method according to claim 5, wherein said II-VI materials include alloys of tellurium with mercury and alloys of tellurium with zinc.

11. A method according to claim 5, wherein said II-VI materials include alloys of tellurium with cadmium and alloys of tellurium with zinc.

12. A method according to claim 1, wherein said superlattice providing step includes providing a superlattice coated with a stack of semi-conductor layers made of IV-VI materials.

13. A method according to claim 12, wherein said IV-VI materials include lead or tin telluride.

14. A method according to claim 1, wherein said step of applying a working light includes applying a working light lying within a predetermined frequency bandwidth, and further comprising a step of receiving an output light corresponding to said working light having passed through said superlattice.

15. A method according to claim 14, wherein said step of applying a working light lying within a predetermined frequency bandwidth includes applying a working light within a predetermined frequency bandwidth included in the absorption range of said superlattice in the absence of an applied electric field.

16. A method according to claim 1, wherein step a) includes providing a superlattice comprising a periodic stack of semi-conductor layers extending along a growth axis thereof over a few nanometers.

17. A method according to claim 1, including widening at least said authorized sub-band of energy for electrons in step a) in accordance with a wave function having appreciable evanescent skirts to define said resonant coupling.

18. A method according to claim 1, wherein step c) includes applying to said superlattice, parallel to said growth axis thereof, a control electric field of a few kilovolts per centimeter.

19. A method according to claim 1, wherein said wavelength of said working light is higher than that corresponding to an excitonic resonance within the superlattice.

20. A method according to claim 1, wherein step c) includes applying a control electric field to said superlattice, parallel to said growth axis thereof, to alter said resonant coupling for varying the width of said band by a few milli-electron-volts.

21. A method according to claim 1, wherein step c) includes applying a control electric field to said superlattice, parallel to said growth axis thereof, to alter said resonant coupling for diminishing the width of said given band of progressive optical absorption properties.

22. An electro-optical method, comprising the steps of:
a) providing a superlattice comprising a periodic stack of semi-conductor layers extending along a growth axis thereof, said layers having materials and thicknesses selected together for conferring to said superlattice a dimension between 2 and 3 with regard to motion of electrons along both said growth axis and two directions transverse to said growth axis; and
b) applying to said superlattice, parallel to said growth axis thereof, a control electric field of up to a few tens of kilovolts per centimeter.

23. A method according to claim 22, wherein step a) includes providing a superlattice comprising a periodic stack of semi-conductor layers extending along a growth axis thereof over a few nanometers.

* * * * *